United States Patent [19]

Riggs et al.

[11] 4,266,796
[45] May 12, 1981

[54] TRAILER TONGUE WHEEL

[76] Inventors: Robert L. Riggs, 361 NE. Village Squire, Gresham, Oreg. 97030; Howard Riggs, Rte. 2, Box 474, Aurora, Oreg. 97002

[21] Appl. No.: 89,031

[22] Filed: Oct. 29, 1979

[51] Int. Cl.³ .............................................. B605 9/16
[52] U.S. Cl. ............................. 280/414 R; 280/43.24; 280/767
[58] Field of Search ............... 280/414 R, 475, 476 R, 280/763, 764, 765, 766, 767, 656, 43.24, 47.13 B, 62, 43.1

[56] References Cited

U.S. PATENT DOCUMENTS

| | | | |
|---|---|---|---|
| 2,159,395 | 5/1939 | Mersereau | 280/764 |
| 2,205,436 | 6/1940 | Richards | 280/766 |
| 2,810,588 | 10/1957 | Rozett | 280/414 R |
| 3,237,960 | 3/1966 | Ziegler et al. | 280/763 |
| 3,348,860 | 10/1967 | Buckles | 280/414 R |
| 3,348,861 | 10/1967 | Curtis et al. | 280/414 R |
| 3,779,579 | 12/1973 | Ostwald | 280/475 |

*Primary Examiner*—David M. Mitchell

*Attorney, Agent, or Firm*—Lee R. Schermerhorn

[57] ABSTRACT

In the present construction the tongue wheel is mounted on a strut assembly for pivotal movement from an upper carrying position with the wheel above the tongue to a lower working position with the wheel below the tongue. A lever is insertable in a socket on the strut assembly to pry the wheel down to its working position and lift the tongue off the trailer hitch of the towing vehicle. The same lever is insertable in a different socket in the strut assembly to steer the tongue wheel during manual maneuvering of the trailer. A stand or foot is extendable from the strut assembly to support the tongue independently of said wheel when desired. When the tongue wheel is shifted to its carrying position above the tongue it may be locked in such position to prevent theft of the wheel. For this purpose the tongue lifting and steering lever and the foot are inserted in sockets in the strut assembly on opposite sides of the wheel and interconnected over the tire on the wheel to prevent removal of the tongue wheel from its wheel spindle. These parts are secured in such positions by a padlock.

10 Claims, 11 Drawing Figures

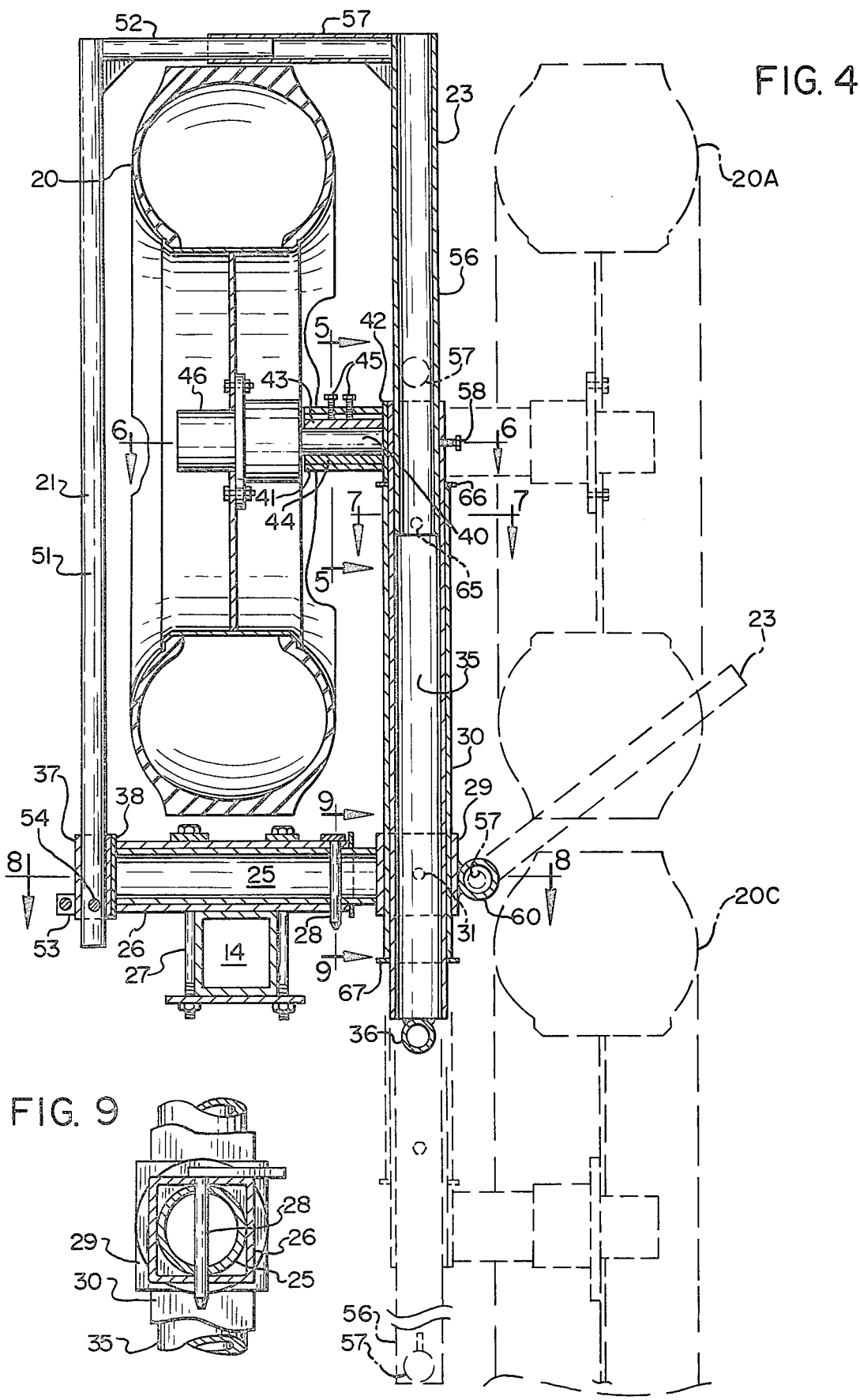

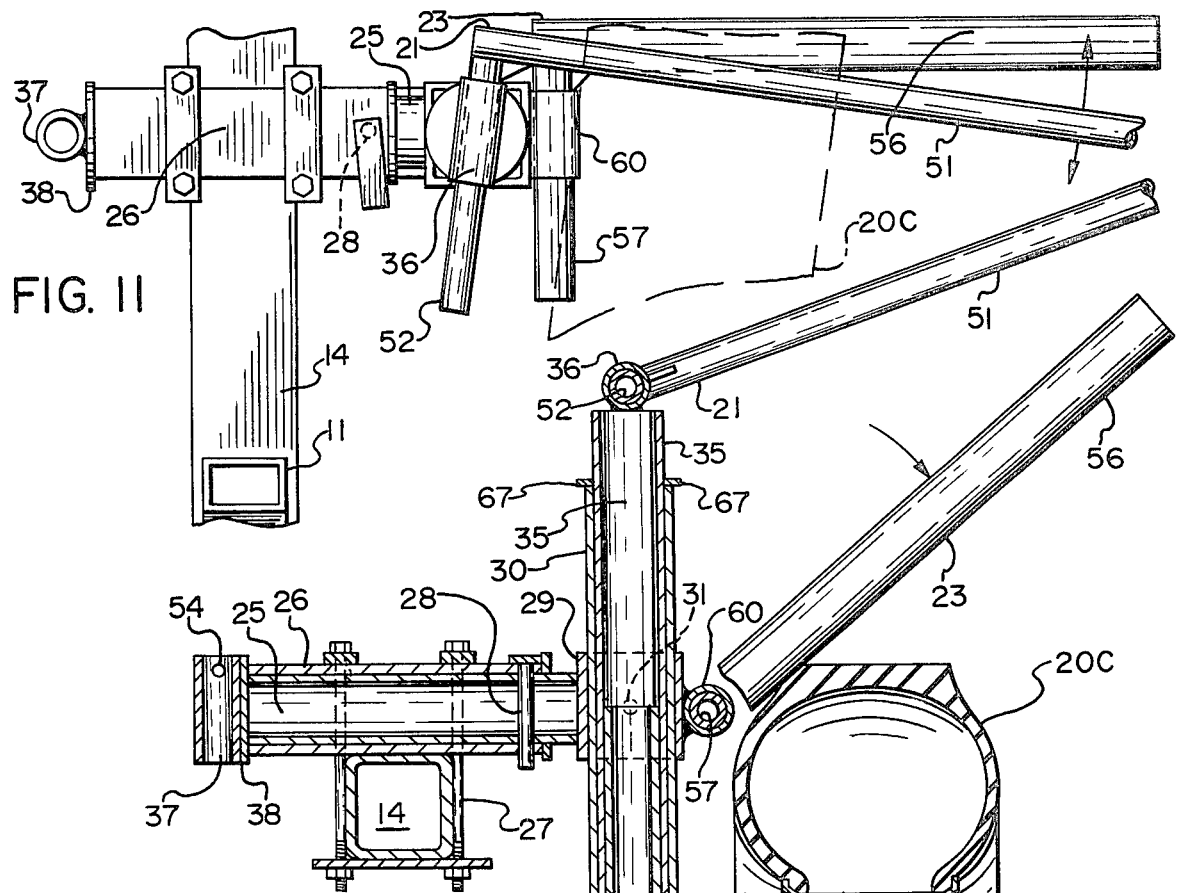
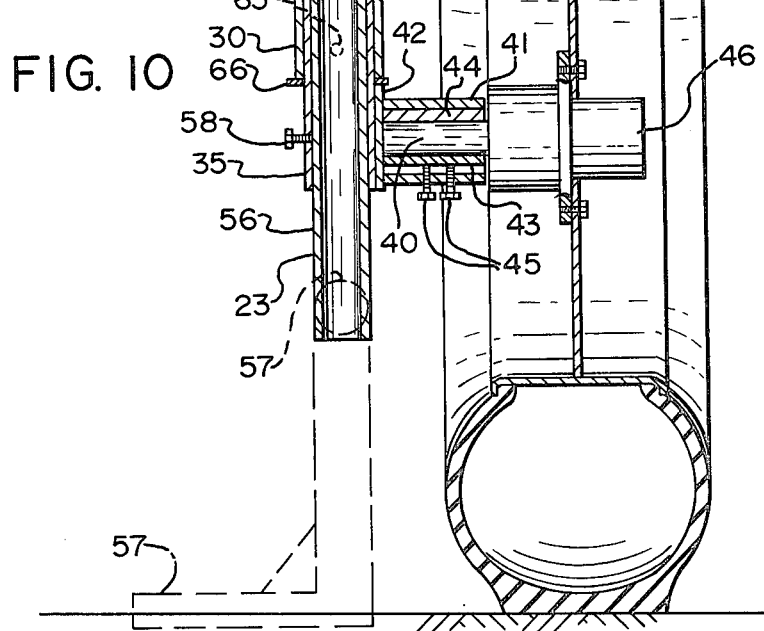

TRAILER TONGUE WHEEL

BACKGROUND OF THE INVENTION

This invention relates to an improved tongue wheel for trailers such as boat trailers, horse trailers and other types of trailers which must be maneuvered by hand after being disconnected from a towing vehicle.

Paved launching ramps have greatly facilated the launching of boats transported over land by trailers towed by automobiles. Nevertheless, there is a need for a type of trailer which may conveniently be maneuvered manually for launching a boat on shore lines where a prepared launching ramp is not available. In many places the nature of the shore line prevents the towing vehicle from backing the trailer down to the water and in many situations the towing vehicle cannot even approach reasonably close to the water line.

Previous attempts to make boat trailers manually maneuverable have not been successful under the conditions encountered on many shorelines where the beach may be quite steep approaching the water level, with loose sand at higher elevations to prevent a close approach by the towing vehicle. Also, the utility of other types of trailers may be greatly extended by making the trailer manually maneuverable into places not accessible to the towing vehicle.

Objects of the present invention are therefore to provide an improved trailer tongue wheel, to provide a tongue wheel which is conveniently steerable, to provide manual braking means for the tongue wheel, to provide a tongue wheel which may be utilized as a jack for lifting the tongue off the trailer hitch on a towing vehicle, to provide a foot or stand for the tongue so that the tongue wheel may be removed when the trailer is disconnected from the towing vehicle, to provide a tongue wheel having a wheel spindle which is available as a replacement for a damaged spindle on the trailer and to provide means for locking the wheel on the tongue to prevent theft of the wheel.

SUMMARY OF THE INVENTION

In the present construction the tongue wheel is mounted on a strut assembly for pivotal movement from an upper carrying position with the wheel above the tongue to a lower working position with the wheel below the tongue. A lever is insertable in a socket on the strut assembly to pry the wheel down to its working position and lift the tongue off the trailer hitch of the towing vehicle. The same lever is insertable in a different socket in the strut assembly to steer the tongue wheel during manual maneuvering of the trailer.

A stand or foot is extendable from the strut assembly to support the tongue independently of said wheel when desired. Thus, the wheel may be removed and used as a spare wheel for the trailer when necessary. The spindle for the tongue wheel is also made removable so that it may be used as a replacement for a damaged trailer wheel spindle.

When the tongue wheel is shifted to its carrying position above the tongue it may be locked in such position to prevent theft of the wheel. For this purpose the tongue lifting and steering lever and the foot are inserted in sockets in the strut assembly on opposite sides of the wheel and interconnected over the tire on the wheel to prevent removal of the tongue wheel from its wheel spindle. These parts are secured in such positions by a padlock.

The invention will be better understood and the foregoing and additional objects and advantages will become apparent from the following description of the preferred embodiment of the invention illustrated in the accompanying drawing. Various changes may be made however in the details of construction and arrangement of the parts and certain features may be used without others. All such modifications within the scope of the appended claims are included in the invention.

BRIEF DESCRIPTION OF THE DRAWINGS

FIG. 4 is a view on the line 4—4 in FIG. 1.
FIG. 9 is a view on the line 9—9 in FIG. 4.
FIG. 10 is a view on the line 10—10 in FIG. 3.
FIG. 11 is a view on the line 11—11 in FIG. 2.

DESCRIPTION OF THE PREFERRED EMBODIMENT

Figure 1:
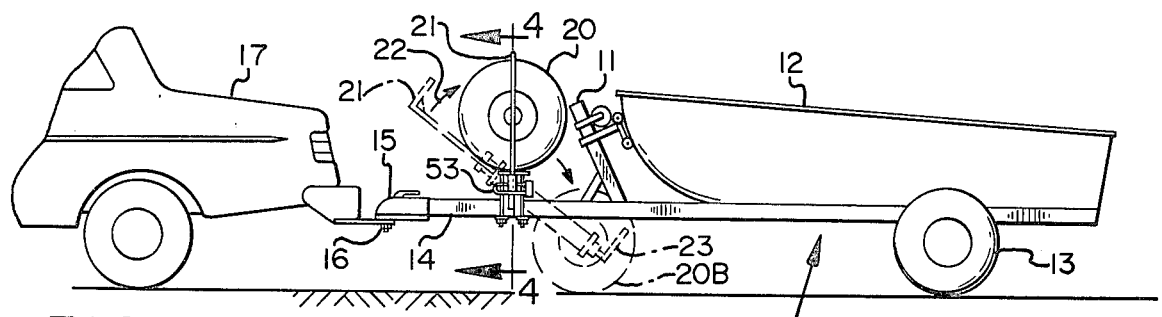
FIG. 1 is a side elevation view of a boat trailer embodying the invention connected to a towing vehicle, showing the tongue wheel in carrying position in solid lines.

The invention is illustrated in connection with a trailer 10 having a boat anchor support or winch tower 11 for securing a boat 12 on the trailer. Most of the weight of the boat is supported by a pair of wheel 13 and a portion of the weight is supported by a tongue 14. The front end of tongue 14 is equipped with a conventional trailer hitch 15 for detachable connection with a trailer hitch 16 on a towing vehicle 17.

Figure 2:
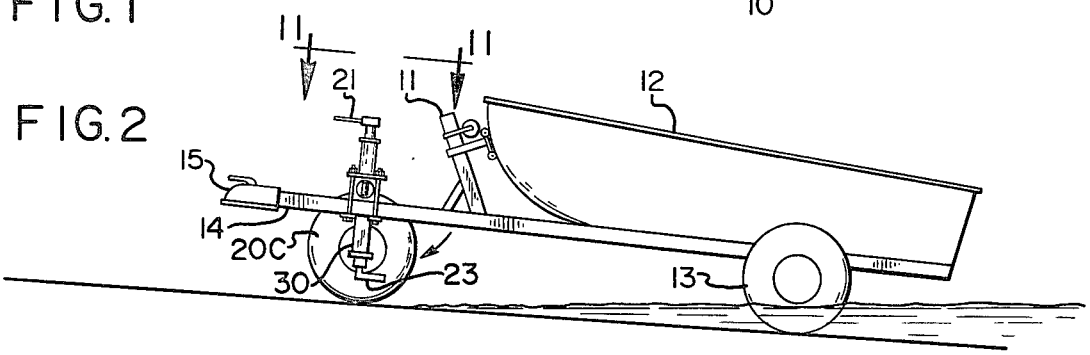
FIG. 2 is a similar view showing the trailer disconnected from the towing vehicle and the tongue wheel in working position.

The invention involves a trailer tongue wheel 20 to facilitate the manual manipulation of the trailer independently of the towing vehicle 17. One example of such a situation is illustrated in FIG. 2 where the condition of a beach may make it impossible for the vehicle 17 to approach close enough to the water so that the boat can be launched in the water while the trailer is still connected to the vehicle. In such a situation the trailer hitch 15 must be disconnected and the trailer wheeled manually into the water.

While the trailer is in tow behind vehicle 17 the tongue wheel 20 is secured in an upper retracted carrying position directly over tongue 14 as shown in solid lines in FIG. 1. To lower the wheel to working position it is first rotated from a position directly over the tongue 14 to an upper position at one side of the tongue as illustrated at 20A in broken lines in FIG. 4. Then the wheel may be lowered alongside the tongue to a ground engaging position as shown in broken lines at 20B in FIG. 1. Then by applying a manual lever 21 and lifting it in the direction of arrow 22 the wheel is rotated to its working position 20C shown in FIG. 2, which manipulation lifts tongue 14 sufficiently to disengage trailer hitch 15 from the hitch part 16 on the vehicle 17. Lever 21 is then inserted in a different position to serve as a steering arm for the tongue wheel for steering the trailer during manual manuvering.

Figure 3:
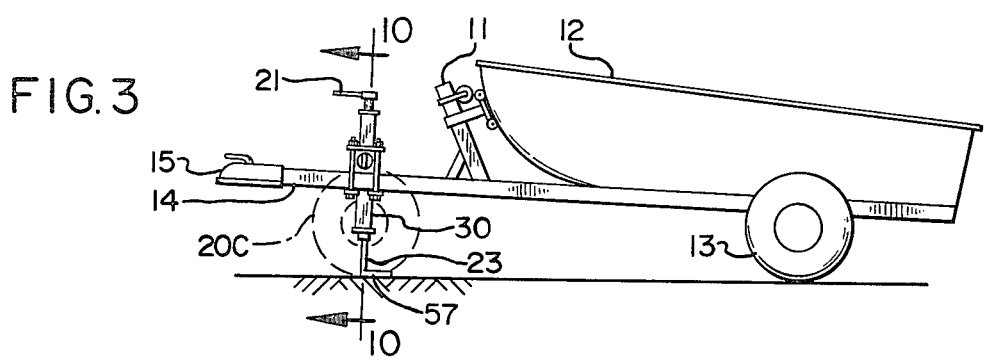
FIG. 3 is a similar view showing the trailer disconnected from the towing vehicle with the tongue wheel in working position but with the tongue supported by a stand or foot associated with the tongue wheel.

A stand or foot 23 may be extended as shown in FIG. 3 to support tongue 14 independently of the wheel 20 and make it possible to remove the wheel while the trailer is disconnected from the towing vehicle. Manual braking means are provided for the wheel and also locking means are provided to prevent theft of the wheel in its solid line carrying position at 20 in FIG. 1. These and other details will be explained as the description proceeds.

Figure 8:
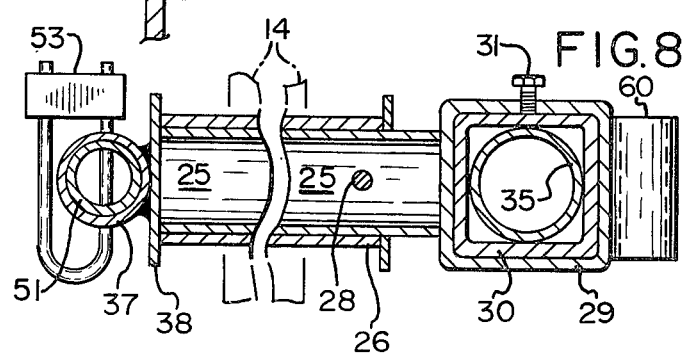
FIG. 8 is a view on the line 8—8 in FIG. 4.

As seen in FIGS. 4 and 9 a cylindrical strut spindle 25 is mounted for rotation in square spindle housing 26 which is mounted on tongue 14 by means of bolts 27. A vertical pin 28 is inserted in holes in spindle 25 and housing 26 to hold the spindle in one or the other of two different rotative positions. One end of spindle 25 is welded to one side of a short square transverse socket tube 29 in such position that socket tube 29 will be held in vertical position by pin 28. A square strut tube 30 is adjustable longitudinally in socket tube 29 and secured in adjusted position by a set screw 31 which is best shown in FIG. 8.

A cylindrical tubular steering spindle 35 is rotatably mounted in strut tube 30. Spindle 35, strut tube 30 and steering spindle 35 comprise a strut assembly for rotating the wheel from its upper position at 20A to its lower position at 20C in FIG. 4. A tubular socket 36 is welded on one end of steering spindle 35 and a tubular socket 37 is welded to a plate 38 which is welded to the end of strut spindle 25 opposite the end carrying socket tube 29.

Figure 5:
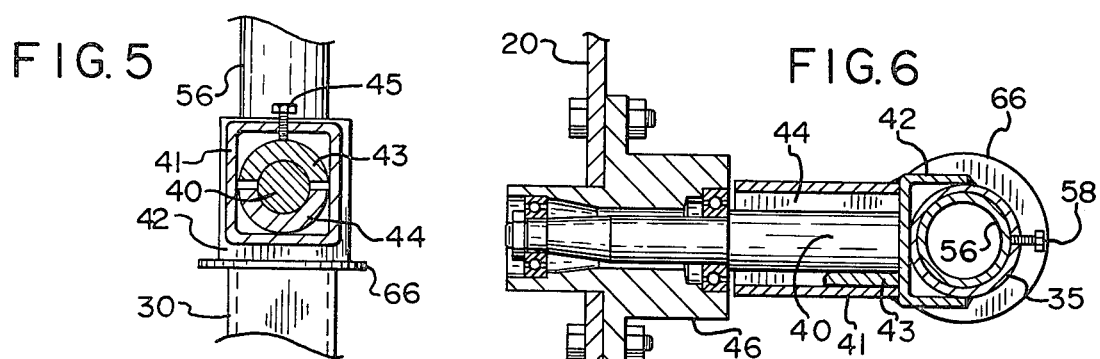
FIG. 5 is a view on the line 5—5 in FIG. 4.
Figure 6:
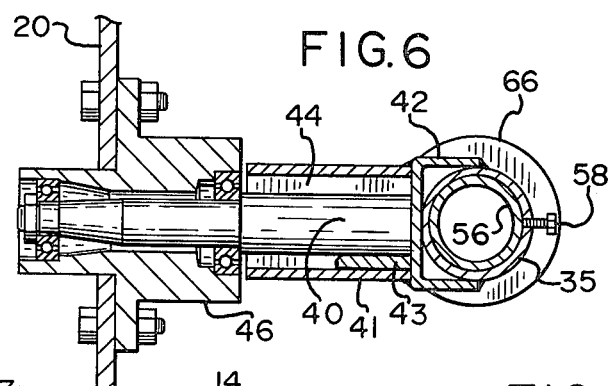
FIG. 6 is a view on the line 6—6 in FIG. 4.

A wheel spindle 40 is contained in a square spindle housing 41 which is welded at one end to a channel member 42 which is in turn welded to steering spindle 35 as shown in FIGS. 4, 5 and 6. Spindle 40 is clamped between two semicircular bushings 43 and 44 by set screws 45 to make the spindle 40 readily removable for emergency use as a spare spindle for one of the trailer wheels 13. Spindle 40 supports the hub 46 of the wheel 20.

Lever 21 is an L-shaped member having a long arm 51 and short arm 52 at right angles to each other. When the long arm 51 is inserted in socket 37 as shown in FIGS. 4 and 8 a padlock 53 may be inserted through registering holes 54 in socket 37 and arm 51.

Stand or foot 23 is also an L-shaped member having a long arm 56 and a short tubular arm 57. Long arm 56 is inserted in steering spindle 35 and the short arm 52 of lever 21 is inserted in the short arm 57 of foot 23. Thus the long arm 51 of lever 21 extends across one side of wheel 20 and the long arm 56 of the foot 23 extends as a continuation of steering spindle 35 across the opposite side of the wheel to prevent theft of the wheel from wheel spindle 40 when the parts are secured in assembled position by padlock 53.

For manual maneuvering of the trailer as shown in FIG. 2, lever 21 is removed and foot 23 is rotated 90° from its position in FIG. 4 and retracted into steering spindle 35 and secured in retracted position by set screw 58 in FIGS. 4 and 6. The wheel is rotated on the axis of steering spindle 35 from position 20 to position 20A in FIG. 4 and then rotated on the axis of strut spindle 25 down to position 20B in FIG. 1, with pin 28 removed.

In order to pry up the tongue 14 to disengage trailer hitch 15 from hitch part 16 as the wheel is shifted from its position at 20B in FIG. 1 to its position at 20C in FIG. 2, the lever 21 is inserted in the opposite end of socket 37 to extend upward as shown in FIG. 1 and rotated in the direction of arrow 22. Then, with the wheel and strut assembly secured in FIG. 2 position by the pin 28 in FIG. 4, the lever 21 is removed from socket 37 and the short arm 52 of the lever is inserted in socket 36 for steering as shown in FIGS. 10 and 11.

When manual braking is desired, foot 23 is removed from steering spindle 35 and the short arm 57 of the foot is inserted in a socket 60 on the square socket tube 29 as shown in FIGS. 10 and 11. Thus the foot 23 is rotatable in socket 60 and its long arm 56 may be swung into engagement with the tire on the wheel at 20C to provide a hand brake for the wheel. Arm 57 may be inserted into either end of socket 60 depending on the direction of rotation of the wheel, so that tire friction on arm 56 will not force arm 57 out of socket 60. Brake arm 56 does not follow the steering movements of the wheel but this is not a disadvantage because the brake is usually needed only in an approximately straight line of travel.

In FIGS. 10 and 11 both the brake arm 56 and the steering arm 51 extend from the same side of tongue 14 so that an operator may grasp one of these arms in each hand to brake and steer the trailer, as for example in the down hill movement in FIG. 2. Steering arm 51 may also be swung across the tongue to steer from the opposite of the trailer if desired.

In the use of the foot 23 to support the tongue 14, the wheel is placed in working position 20C in FIGS. 3 and 10 and then the tongue is lifted manually to raise the wheel off the ground while the foot 23 is extended downward to bear against the ground (broken lines in FIG. 10) and secured in this position by set screw 58. Wheel 20 is identical to the trailer wheels 13 so that the wheel 20 may be utilized as a replacement wheel if one of the wheels 13 is damaged or has a flat tire. Frequent immersion of the trailer wheels 13 in water, especially salt water, often results in damage to a wheel spindle in a wheel 13. In such event the damaged wheel spindle in a wheel 13 may be removed by a torch and replaced by welding in place the tongue wheel spindle 40 which is removable by merely loosening set screws 45.

It will be observed that each of the L-shaped levers 21 and 23 serves three purposes. First, they cooperate with each other and padlock 53 in FIG. 4 to prevent theft of wheel 20. Additionally, in FIG. 1 lever 21 serves as a pry bar to lift tongue 14 and rotate the wheel down to its working position at 20C in FIG. 2, and in FIGS. 2, 10 and 11 lever 21 serves as a steering arm or tiller. Lever 23 serves additionally as a hand brake in FIGS. 10 and 11 and as a foot or jack stand in FIGS. 3 and 10 (in broken lines).

Figure 7:
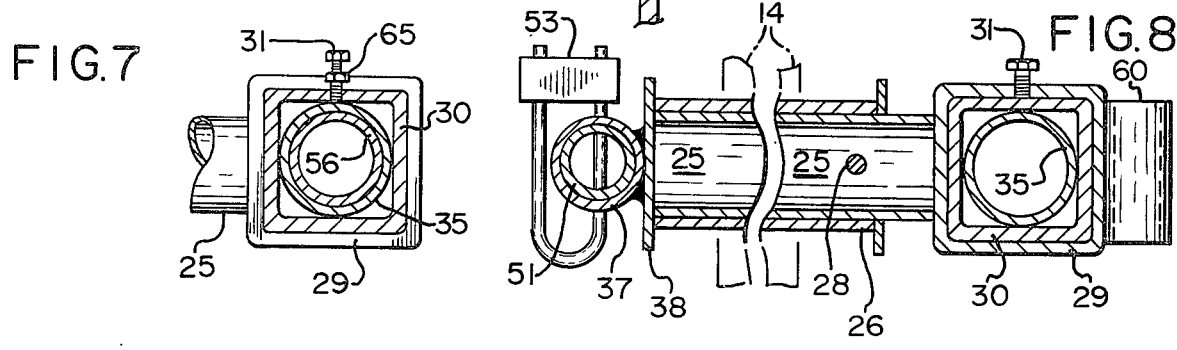
FIG. 7 is a view on the line 7—7 in FIG. 4.

When desired, steering spindle 35 may be locked against rotation by set screw 65 in FIGS. 4 and 7.

Washers 66 and 67 are welded on the ends of square strut tube 30. In the working position of the wheel at 20C in FIGS. 2 and 10 the weight of tongue 14 is transmitted through strut tube 30 and washer 66 to channel member 42 and wheel spindle 40. Washer 66 serves as thrust bearing for steering spindle 35. The effective length of strut tube 30 is readily adjusted by loosening set screw 31 and sliding the strut tube in socket tube 29. This length adjustment allows tongue 14 to be lifted sufficiently to raise trailer hitch 15 off hitch part 16 as described in connection with FIG. 1.

What is claimed is:

1. In a trailer vehicle having a tongue for towing the vehicle, a spindle housing mounted in transverse horizontal position on said tongue; a strut assembly comprising a strut spindle mounted for rotation in said housing, a tongue supporting strut mounted on one end of said spindle, and a steering spindle rotatable in said strut; a wheel spindle on one end of said steering spindle, and a wheel on said wheel spindle; said strut assembly and strut spindle being rotatable in said housing 180° from a downwardly extending working position to an upwardly extending position with said wheel above and at one side of said tongue, said steering spindle being rotatable 180° in said strut to position said wheel over said tongue in a carrying position; a steering and tongue lifting lever, a transverse socket on said steering spindle to receive said lever for steering said wheel on the ground in said working position, and a second socket in said strut assembly transverse to said strut spindle to receive said lever for swinging said strut to said working position and lifting said tongue.

2. The invention of claim 1 wherein said second socket is mounted on the opposite end of said strut spindle.

3. The invention of claim 2 including a supporting foot connected to said strut assembly for supporting said tongue on the ground independently of said wheel.

4. The invention of claim 3, said supporting foot comprising an L-shaped member having two arms at right angles to each other.

5. The invention of claim 4, said lever comprising an L-shaped member having two arms at right angles to each other, said steering spindle being tubular to receive one of said arms of said foot, the other arm of said foot being tubular to receive one of said arms of said lever when the other arm of said lever is disposed in said second socket, said foot and lever thus assembled over the wheel in said carrying position preventing removal of said wheel from said wheel spindle, and a lock securing said other arm of said lever in said second socket to hold said foot and lever in said assembled relation to prevent theft of the wheel.

6. The invention of claim 4 including a transverse socket on said strut assembly to pivotally receive said other arm of said foot adjacent a tire on said wheel, said one arm of said foot having pivotal movement to engage said tire and provide a hand brake for the trailer.

7. The invention of claim 1, said wheel spindle being removably mounted on said steering spindle.

8. The invention of claim 7, said removable mounting comprising a square tube extending horizontally from one side of said steering spindle, a pair of semi-cylindrical bushings surrounding said wheel spindle in said square tube, and set screws in a side of said square tube clamping said bushings against said wheel spindle.

9. The invention of claim 1, said spindle housing and strut spindle having a diametral hole to hold said strut in a downwardly extending tongue supporting working position or in an upwardly extending carrying position.

10. The invention of claim 1, said strut comprising a square tube adjustable lengthwise in a square socket tube on said one end of said strut spindle to support said tongue at a desired height on said wheel, and a set screw in said socket tube clamping said strut tube in adjusted position.

* * * * *